(12) United States Patent
Lennen (10) Patent No.: US 9,784,845 B2
(45) Date of Patent: Oct. 10, 2017

(54) METHOD AND APPARATUS FOR IMPLEMENTING REDUCED BANDWIDTH PROCESSING OF NAVIGATION SATELLITES

(71) Applicant: Samsung Electronics Co., Ltd., Gyeonggi-do (KR)

(72) Inventor: Gary Lennen, Cupertino, CA (US)

(73) Assignee: Samsung Electronics Co., Ltd (KR)

(*) Notice: Subject to any disclaimer, the term of this patent is extended or adjusted under 35 U.S.C. 154(b) by 381 days.

(21) Appl. No.: 14/552,051

(22) Filed: Nov. 24, 2014

(65) Prior Publication Data

US 2015/0177384 A1 Jun. 25, 2015

Related U.S. Application Data

(60) Provisional application No. 61/920,151, filed on Dec. 23, 2013.

(51) Int. Cl.
*G01S 19/13* (2010.01)
*G01S 19/09* (2010.01)
*G01S 19/03* (2010.01)
*G01S 19/30* (2010.01)

(52) U.S. Cl.
CPC .................... *G01S 19/30* (2013.01)

(58) Field of Classification Search
CPC ......................................... G01S 19/13
USPC ............. 342/357.21, 357.4, 357.46, 357.51; 701/468, 469
See application file for complete search history.

(56) References Cited

U.S. PATENT DOCUMENTS

| 4,785,463 | A | 11/1988 | Janc et al. |
|---|---|---|---|
| 6,728,325 | B1 | 4/2004 | Hwang et al. |
| 2007/0116098 | A1 | 5/2007 | Valio et al. |
| 2007/0258511 | A1 | 11/2007 | Knight et al. |
| 2009/0121928 | A1 | 5/2009 | Pon |
| 2010/0208775 | A1* | 8/2010 | Weill ............... G01S 19/37 375/150 |

* cited by examiner

*Primary Examiner* — Dao Phan
(74) *Attorney, Agent, or Firm* — The Farrell Law Firm, P.C.

(57) ABSTRACT

A method and apparatus for processing navigational signals with reduced bandwidth by receiving a combination of two navigational signals, reducing the frequency of the combined two navigational signals to an intermediate frequency (IF); converting the IF signal to digital signals; translating the frequency of the IF signal to near baseband; filtering the near baseband signal; reducing the sample rate of the filtered near-baseband signal by a factor; translating a selection of the reduced, filtered, near-baseband signal to a single sidelobe; storing the single sidelobe in memory; and processing the single sidelobe for navigational purposes.

24 Claims, 12 Drawing Sheets

METHOD AND APPARATUS FOR IMPLEMENTING REDUCED BANDWIDTH PROCESSING OF NAVIGATION SATELLITES

PRIORITY

This application claims priority under 35 U.S.C. §119(e) to U.S. Provisional Application Ser. No. 61/920,151, which was filed in the U.S. Patent and Trademark Office on Dec. 23, 2013, the contents of which are incorporated herein by reference.

BACKGROUND OF THE INVENTION

Field of the Invention

The present invention relates generally to a method and apparatus for reducing resources required for processing signals from multiple Global Navigation Satellite System (GNSS) constellations, and, more particularly, to the efficient processing of the next generation of GNSS signals.

Description of the Related Art

Figure 1:
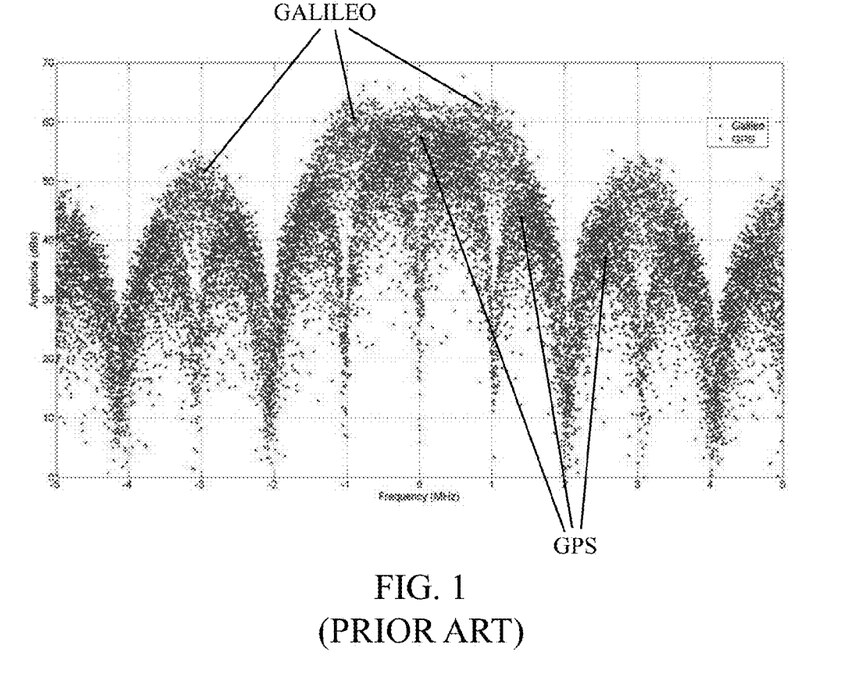
FIG. 1 is an illustration of a spectrum of a GPS signal and a Galileo signal.

The next generation of GNSS signals is being developed and will soon be ready for implementation. However, the new signals create a number of reception problems, as follows: requiring higher receiver sampling rates, requiring greater receiver memory capacity due to the higher sampling rates, having greater susceptibility to interference due to the wider bandwidth caused by the higher sampling rates, causing greater difficulty in tracking multiple signal correlation peaks, requiring a more complex correlation function, causing more complicated interaction with multipath signals due to using a more complex correlation function, and causing increased range measurement error due to the use of more complex correlation functions. In the case of a receiver described herein, the increased complex sampling rate is 8fx vs. 2fx, an increase of a factor of 4. In addition, the presence of multiple signal peaks makes tracking the correct peak more difficult. Tracking a wrong peak may lead to a range error of approximately 150 meters. Current GNSS signals include Galileo GNSS Binary Offset Carrier (1,1) (BOC(1, 1)) and Global Positioning System (GPS) L1-C transmissions. FIG. 1 illustrates the spectrum of exemplary GPS and Galileo signals, and FIG. 2 illustrates a prior art GPS/Galileo receiver.

Figure 2:
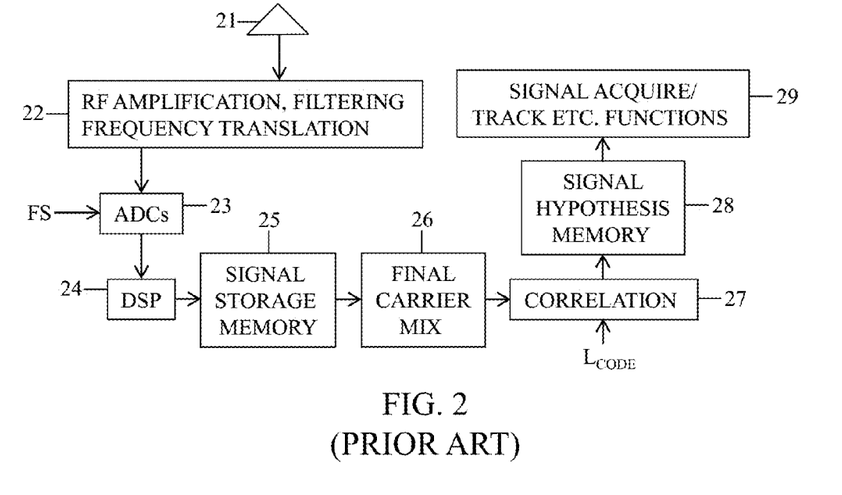
FIG. 2 is a schematic block diagram of a prior art GPS/Galileo receiver.

In FIG. 2, the antenna 21 receives a combination of GPS and Galileo satellite signals and outputs a signal $s_{RF}$. The output signal $s_{RF}$ is passed to a Radio Frequency (RF) block 22 that performs signal amplification, filtering, frequency translation, and outputs a signal $s_{IF}$, which is typically an amplified signal whose center frequency has been reduced substantially to facilitate reasonable sampling rates. In the example provided here, the sampling rate $F_S$=48fx=49.107 MHz, where fx=1.0230625 MHz. The signal $s_{IF}$ is then sampled and quantized in an array of two Analog to Digital Converters (ADCs) 23 for representing a complex signal. The resulting digitized/quantized signal $s_{digital}$ is passed to the digital signal preprocessor (DSP) 24 at a complex sampling rate of 48fx. The function of the DSP 24 is to further filter the signals and may include RF Automatic Gain Control (AGC) computation and interference mitigation. The output $s_{8fx}$ of the DSP 24 is reduced to a complex sampling rate of 8fx. A signal storage memory 25 is connected to the DSP 24. All received GPS and Galileo satellite signals are present in the 8fx samples stored in the signal storage memory 25. Individual satellite processing is performed after the GPS and Galileo signals are stored in the signal storage memory 25, and includes a final carrier mixer 26 connected to the signal storage memory 25, a correlation block 27 connected to the signal storage memory 25, where the correlation block 27 receives an appropriate local spreading code or $L_{code}$ as input, a signal hypothesis memory 28 connected to the correlation block 27, and a signal acquire/track etc. function block 29 connected to the signal hypothesis memory 28.

The correlation operation for a particular satellite uses a local spreading code replica ($L_{code}$) to de-spread the individual satellites. Each GPS satellite has its own course/acquisition (C/A) spreading code. The $L_{code}$ representation for a Galileo BOC(1,1) signal has a different form in that it is the combination of a Galileo satellite spreading code and a subcarrier. The subcarrier is used to transmit the Galileo satellite signal and is a 1.023 MHz square wave. The subcarrier portion of a transmission generates the dual frequency sidelobes shown in FIG. 1. To correlate with a BOC(1,1) signal, a locally generated replica of the subcarrier, as well as the satellite spreading code, must be produced as in FIG. 3 described below. The output of the DSP 24 is then stored in the signal storage memory 25.

Figure 3:
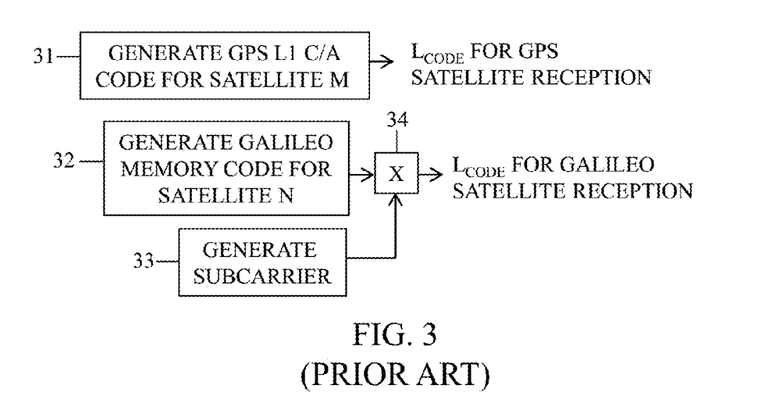
FIG. 3 is a schematic block diagram of prior art functional blocks for locally replicating a GPS $L_{code}$, a Galileo $L_{code}$, and a Galileo subcarrier in a GPS/Galileo receiver.

FIG. 3 illustrates an $L_{code}$ generator 31 for locally replicating an $L_{code}$ for GPS satellite reception and an $L_{code}$ generator that includes a Galileo memory code generator 32, a subcarrier generator 33, and a multiplier 34 for multiplying the Galileo memory code with the locally replicated subcarrier to locally replicate the $L_{code}$ for Galileo satellite signals.

Figure 4:
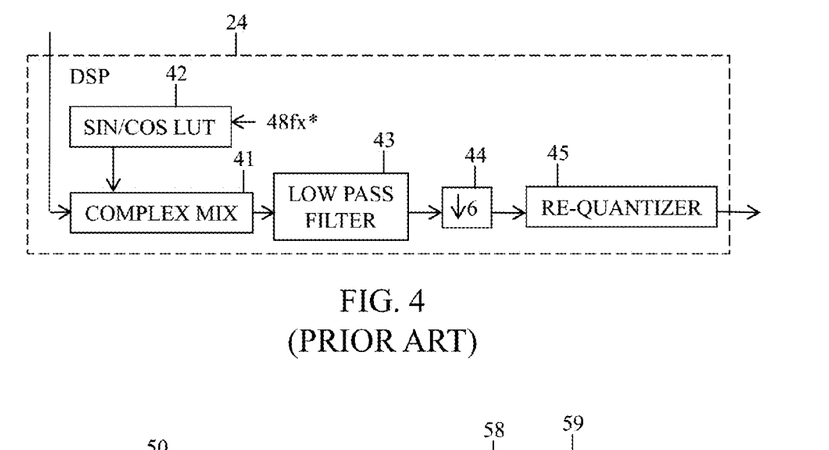
FIG. 4 is a schematic block diagram of a prior art DSP for the GPS/Galileo receiver of FIG. 2.

FIG. 4 illustrates the prior art DSP 24 of FIG. 2 that includes a complex mixer 41 for receiving a GPS/Galileo signal sampled at a complex sampling rate of 48fx. A look-up table (LUT) 42 sampled at a complex sampling rate of 48fx is connected to the complex mixer 41. A low-pass filter 43 connected to the complex mixer 41 receives a signal sampled at a complex sampling rate of 48fx. A sample-rate reducer 44 connected to the low-pass filter 43 reduces a signal sampled at a complex sampling rate of 48fx to a signal sampled at a complex sampling rate of 8fx. A re-quantizer 45 connected to the sample-rate reducer 44 outputs a 2-bit quantized GPS/Galileo signal sampled at a complex sampling rate of 8fx. The DSP 24 translates the frequency of a GPS/Galileo signal from an intermediate frequency (IF) (e.g. 7fx) to a carrier frequency near baseband, low-pass filters the translated signal at 3 MHz, and re-quantizes the signal to 2-bits (sign+magnitude). Note that the sample rate is reduced from 48fx at the output of the low-pass filter 43 to 8fx at the output of the sample-rate reducer 44.

Methods, systems, and devices are needed to address the problems caused by the new GNSS signals (e.g., higher sampling rates, wider bandwidths, multiple correlation peaks, cross-correlation issues, and increasing complexity of GNSS signals).

SUMMARY OF THE INVENTION

The present invention has been made to address at least the problems and/or disadvantages described above and provides at least the advantages described below.

Accordingly, an aspect of the present invention provides methods and apparatuses, in which resources required to process multi-constellation GNSS signals in a receiver are reduced.

Another aspect of the present invention provides methods and apparatuses, in which a GNSS signal with two sidelobes is translated to a signal with a single sidelobe.

Another aspect of the present invention provides methods and apparatuses, in which a GNSS signal with two sidelobes is processed, where both sidelobes are processed or only one of the sidelobes is processed for interference mitigation.

Another aspect of the present invention provides methods and apparatuses, in which a GNSS signal with two sidelobes is processed to obtain either 2fx, 2-bit quantized Galileo complex signal samples or 8fx, 2-bit quantized GPS complex signal samples.

Another aspect of the present invention provides methods and apparatuses, in which a GNSS signal with two sidelobes is processed using a numerically controlled oscillator (NCO) with or without phase correction.

According to an aspect of the present invention, a method of processing navigational signals with reduced bandwidth includes receiving a combination of two navigational signals, where one of the navigational signals includes an upper sidelobe and a lower sidelobe, reducing the frequency of the combined two navigational signals to an intermediate frequency (IF), converting the IF signal to digital signals that can represent a complex signal, translating the frequency of the IF signal to near baseband, filtering the near baseband signal, reducing the sampling rate of the filtered near-baseband signal by a user-definable factor, and translating a user-definable selection of the reduced, filtered, near-baseband signal to a single sidelobe.

According to another aspect of the present invention, an apparatus for processing navigational signals with reduced bandwidth includes a receiver for receiving a combination of two navigational signals, where one of the navigational signals includes an upper sidelobe and a lower sidelobe, a frequency reduction block connected to the receiver for reducing the frequency of the combined two navigational signals to an intermediate frequency (IF), an array of analog to digital converters connected to the frequency reduction block for converting the IF signal to digital signals that can represent a complex signal, a frequency translator connected to the array of analog-to-digital converters for translating the frequency of the IF signal to near baseband, a filter connected to the frequency translator for filtering the near baseband signal, a sample-rate reducer connected to the filter for reducing the sample rate of the filtered near-baseband signal by a user-definable factor, and a signal translator connected to the sample-rate reducer for translating a user-definable selection of the reduced, filtered, near-baseband signal to a single sidelobe.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of the embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The present invention applies to modernized GNSS signals. Currently these signals include the Galileo BOC(1,1) and GPS L1-C transmissions. In the future, it is likely that additional modernized GNSS satellite signals will be transmitted.

The present invention is described with regard to Galileo BOC(1,1) transmissions, which include both E1-B transmissions (i.e., channel B within Galileo carrier signal E1 for data) and E1-C (i.e., channel C within Galileo carrier signal E1 for ranging codes). These signals are "modernized" with regard to the GPS L1 course/acquisition (C/A) transmission. The power spectral density of a Galileo BOC(1,1) transmission is larger than that of a GPS L1 C/A transmission, where most of the signal energy for a Galileo transmission is located within a 4 MHz bandwidth as opposed to a 2 MHz bandwidth for a GPS transmission. The nominal BOC(1,1) correlation shape is more complicated than a GPS signal (i.e., 3 energy peaks for a BOC(1,1) signal as opposed to 1 energy peak for a GPS L1 C/A transmission).

The present invention processes a Galileo BOC(1,1) signal so that a GPS L1 C/A code-like correlation function is produced. The creation of a GPS-like function solves the problems with acquisition spacing of correlators, multi-peak correlation, and performance in the presence of multipath signals. The present invention performs as well as a GPS L1 C/A code in the presence of multipath signals.

The present invention combines the two sidelobes of a BOC(1,1) transmission, in the frequency domain, to reduce the signals bandwidth. Essentially, this removes the BOC (1,1) subcarrier and changes a BOC(1,1) signal into a GPS-like function.

The present invention is also capable of selecting just one of the two frequency sidelobes of a BOC(1,1) transmission for reception, that is, it is capable of receiving one sidelobe and not receiving the other sidelobe. By doing so, the present invention avoids any interference associated with the sidelobe not received.

Figure 5:
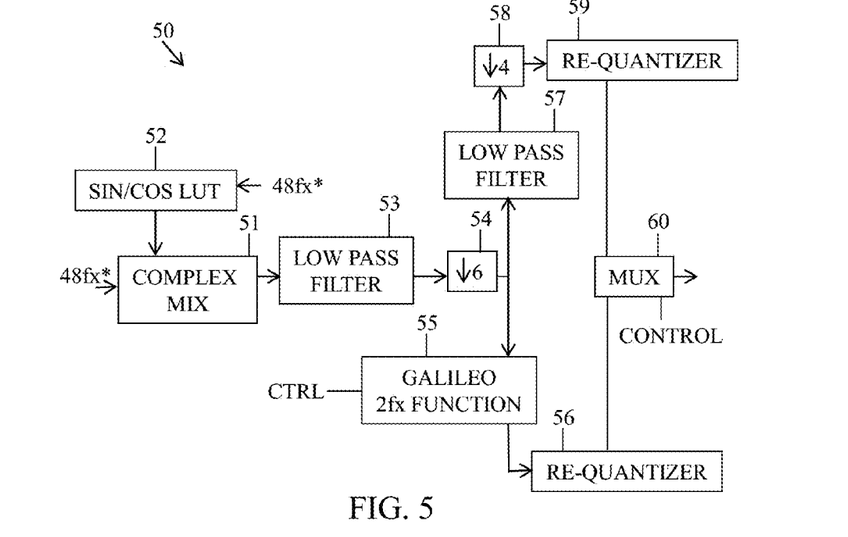
FIG. 5 is a schematic of a DSP in accordance with an embodiment of the present invention.

FIG. 5 is a schematic of an improved DSP 50 of one embodiment of the present invention. The advantages of the present invention are realized by replacing the prior art DSP 24 in FIG. 2 with the improved DSP 50 in FIG. 5. The improved DSP 50 operates on a combination of GPS and Galileo satellite signals.

In FIG. 5, the improved DSP 50 receives the $S_{digital}$ output produced by the array of ADCs of FIG. 2 at a complex mixer 51 in FIG. 5. The complex mixer 51 performs a complex mix on the combined GPS/Galileo satellites signal received as in the complex mixer 41 of the prior art DSP 24 in FIG. 4.

A sine and cosine (or sin and cos) look-up table (LUT) 52 in FIG. 5 is also connected to the complex mixer 51. The sin/cos LUT 52 provides implementations of sin and cos signals to the complex mixer 51 as in the sin/cos LUT 42 of the prior art DSP 24 in FIG. 4.

A first low pass filter 53 in FIG. 5 is connected to the output of the complex mixer 51. The first low-pass filter 53 filters the output of the complex mixer 51 as does the low-pass filter 43 in the DSP 24 of FIG. 4 (e.g., 3 MHz low-pass filter).

A first sample-rate reducer 54 in FIG. 5 is connected to the output of the first low-pass filter 53. The first sample-rate reducer 54 reduces the sample rate of the signal received from the first low-pass filter 53 by a factor of 6, which reduces the sample rate of the signal being processed from 48fx to 8fx, as in the sample-rate reducer 44 in the DSP 24 of FIG. 4. Up to this point, the improved DSP 50 of FIG. 5 is the same as the DSP 24 of FIG. 4.

A Galileo 2fx function block 55 is connected to the output of the first sample-rate reducer 54. The Galileo 2fx function block 55 translates the two sidelobes of the 8fx-sampled Galileo signal output by the first sample-rate reducer 54 to a single sidelobe 2fx sampled signal. This, effectively, reduces the signal bandwidth of the BOC(1,1) signal, removes the BOC(1,1) subcarrier, and causes the result to appear GPS-like. In addition, the Galileo 2fx function block 55 allows just one of the two sidelobes to be processed at a time to mitigate any interference associated with the sidelobe not processed. Additional details of the Galileo 2fx function block 55 are provided below in the description of FIG. 8.

A first re-quantizer 56 in FIG. 5 is connected to the Galileo 2fx function block 55. The first re-quantizer 56 re-quantizes the output of the Galileo 2fx function block 55 to 2fx, 2-bit (sign+magnitude) quantized Galileo complex samples.

The improved DSP 50 allows for the generation of 2fx, 2-bit quantized GPS complex samples. To do so, a second low-pass filter 57 is connected to the output of the first sample-rate reducer 54, where the second low-pass filter 57 filters the signal it receives at 1 MHz.

A second sample-rate reducer 58 is connected to the output of the second low-pass filter 57. The second sample-rate reducer 58 reduces the sample rate of the signal received from the low-pass filter 57 by a factor of 4, which reduces the sample rate from 8fx to 2fx.

A second re-quantizer 59 is connected to the second sample-rate reducer 58. The second re-quantizer 59 re-quantizes the output of the second sample-rate reducer 58 to 2fx, 2-bit (sign+magnitude) quantized GPS complex samples. The resulting memory savings is a factor of two over prior art methods and apparatuses.

A multiplexer 60 is connected to the output of the first re-quantizer 56 and the output of the second re-quantizer 59. A control signal connected to the multiplexer 60 is used to select which of the outputs of the first re-quantizer 56 and the second re-quantizer 59 is output by the improved DSP 50.

The signal samples output by the improved DSP block 50 at 2fx complex sampling rate are transferred to the signal storage memory block 25 of FIG. 2. The signal storage memory block 25 holds the samples such that they may be played back through the subsequent blocks of FIG. 2 at a higher rate (e.g., many times 8fx) in order to facilitate multiple individual satellite processing. Individual satellite processing involves further frequency translation via a final carrier mix function 26 and correlation block 27, storage via a signal hypothesis memory block 28, and signal acquire/track functions via the signal/track function block 29. The correlation block 27 for a particular satellite uses a local spreading code replica ($L_{code}$) to de-spread the individual satellites. Each GPS satellite has its own 1023 C/A spreading code.

Figure 6:
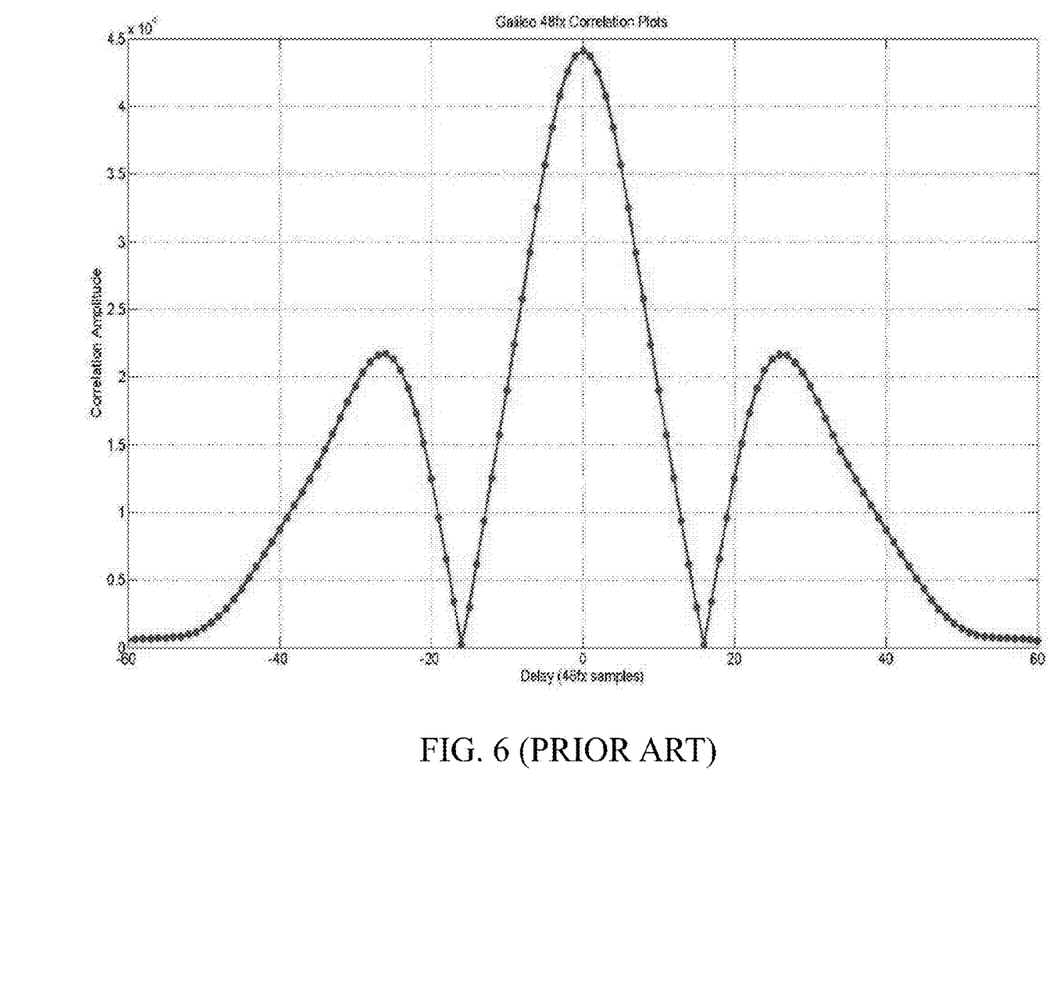
FIG. 6 is a graph of a correlation function generated for a Galileo BOC(1,1) satellite signal in accordance with the prior art.

FIG. 6 is a graph of the correlation function generated with the BOC(1,1) reception in the prior art.

Figure 7:
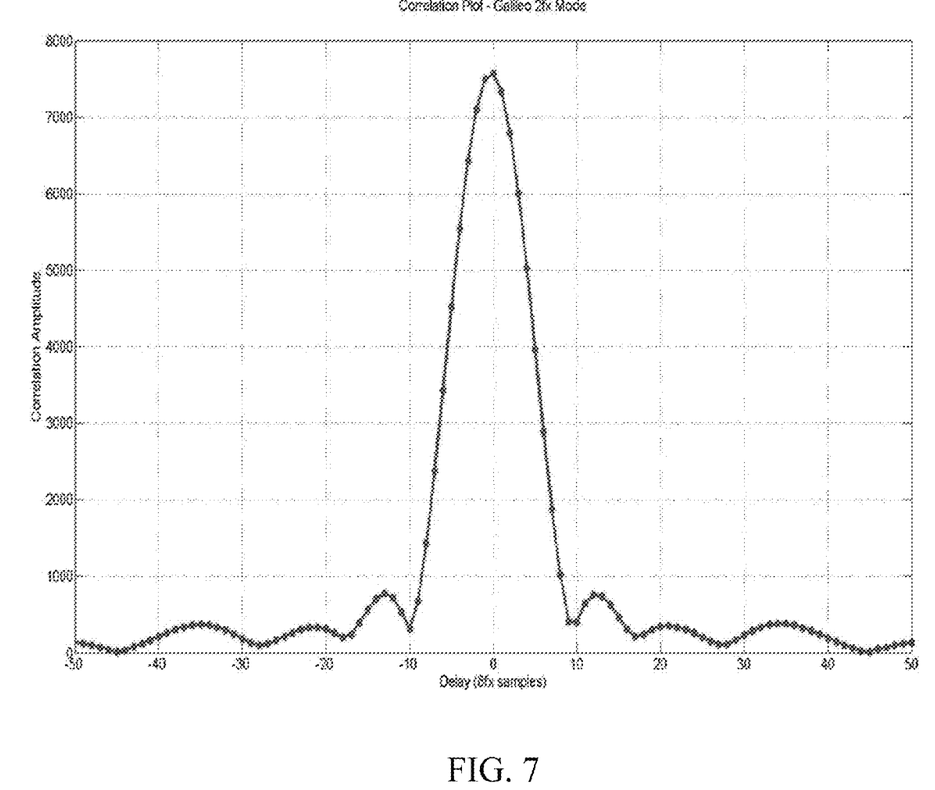
FIG. 7 is a graph of a correlation function generated for a Galileo BOC(1,1) satellite signal in accordance with an embodiment of the present invention.

FIG. 7 is a graph of the Galileo satellite correlation generated by the present invention. It is very similar to a GPS correlation function. The correlation function of a receiver drives all satellite acquisition and tracking functions such that the present invention allows previously designed GPS acquisition and track functions to be used with Galileo satellites. The similarly shaped correlation function also means that Galileo range and range rate measurements in the presence of multipath signals (e.g., urban canyon environments) will be very similar to those of GPS. This allows higher level navigation Kalman Filter tuning to be identical for GPS and Galileo satellites.

Note that the correlation of the Galileo 2fx signal now uses just the Galileo memory code for $L_{code}$. It no longer requires the additional subcarrier component. Essentially, the Galileo 2fx function block 55 in FIG. 5 removed the subcarrier.

Figure 8:
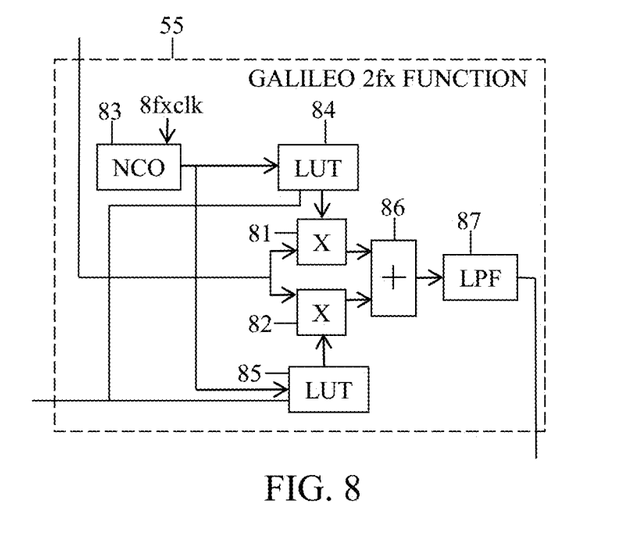
FIG. 8 is a schematic block diagram of the Galileo 2fx function block of FIG. 5.

FIG. 8 is a schematic block diagram of the Galileo 2fx function block 55 of FIG. 5.

In FIG. 8, the Galileo 2fx function block 55 receives an intermediate frequency (IF) signal of approximately 96.25 KHz complex sampled at 8fx on a 10-bit bus at a first multiplier 81 and a second multiplier 82.

The Galileo 2fx function block 55 also includes a numerically controlled oscillator (NCO), where the NCO 83 receives a clock signal sampled at 8fx, where fx is 1.0230625 MHz. The output of the NCO 83 is connected to a first look-up-table (LUT) 84 and a second LUT 85.

The first LUT 84 and the second LUT 85 receive a control signal for controlling whether one or both LUTs 84, 85 are used in a particular operation of the Galileo 2fx function block 55 and, if only one LUT 84, 85 is used, which LUT 84, 85 is used. The 5-bit output bus of the first LUT 84 is connected to the first multiplier 81. The 5-bit output bus of the second LUT 85 is connected to the second multiplier 82.

The 14-bit output busses of the first multiplier 81 and the second multiplier 82 are connected to an adder 86. The 15-bit output bus of the adder 86 is connected to a 1 MHz low-pass filter 87. An IF of approximately 96.25 KHz, complex sampled at 2fx, appears at the 17-bit output bus of the 1 MHz low-pass filter 87.

FIG. 8 allows the lower and upper Galileo frequency sidelobes to be processed together or separately. If processed together, the lower sidelobe is carrier mixed via a 1.023 MHz local carrier representation, and the upper sidelobe is carrier mixed via a −1.023 MHz local carrier representation, where the carrier mixes move the sidelobes to near baseband. The sidelobes are then added together. The combined signal carrier noise (CNO) density loss vs. full BOC(1,1) processing is ≈1 dB. Shutting off either processing arm in FIG. 8 allows a single (lower or upper) sidelobe to be processed. This allows interference mitigation by eliminating interference in the sidelobe not processed. The CNO loss is ≈4 dB with regard to full BOC(1, 1) processing.

Figure 9:
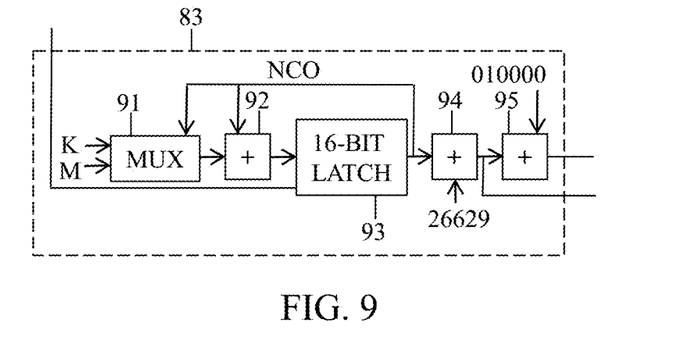
FIG. 9 is a schematic block diagram of a first embodiment of the NCO of FIG. 8.

FIG. 9 is a block diagram of a first embodiment of the NCO 83 of FIG. 8. The NCO 83 generates a local oscillator representation at precisely ±1.023 MHz.

In FIG. 9, a multiplexer 91 receives a first variable K and a second variable M. The output frequency of the NCO 83 is equal to $K \times Fs/(2^N-M+K)$, where K=2046, Fs=48fx=49.107 MHz, and N is the length of the NCO 83 output (e.g., 16 bits). For an exact frequency, K=2046 and $2^N$-M+K=16369, where N=16, M=51213.

The output of the multiplexer 91 is connected to a first adder 92. The output of the first adder 92 is connected to a 16-bit latch 93. The 16-bit latch 93 receives an 8fx clock signal. The 16-bit output bus of the 16-bit latch 93 is connected to the first adder 92. The $16^{th}$ bit (i.e., d15) of the 16-bit output bus of the 16-bit latch 93 is connected to the select input of the multiplexer 91 for selecting M when d15=1 and selecting K when d15=0.

The 16-bit output bus of the 16-bith latch 93 is also connected to a second adder 94. The second adder 94 receives a constant 26629. The 6-bit output bus of the second adder 94 is the output of the NCO 83 that is connected to the LUT in the Galileo 2fx function block 55 of FIG. 8 that outputs a cos signal and is connected to a third adder 95.

The third adder 95 of FIG. 9 receives bits "010000," which does not provide for any phase correction. The 6-bit output bus of the third adder 95 is the output of the NCO 83 that is connected to the LUT in the Galileo 2fx function block 55 of FIG. 8 that outputs a sin signal.

Figure 10:
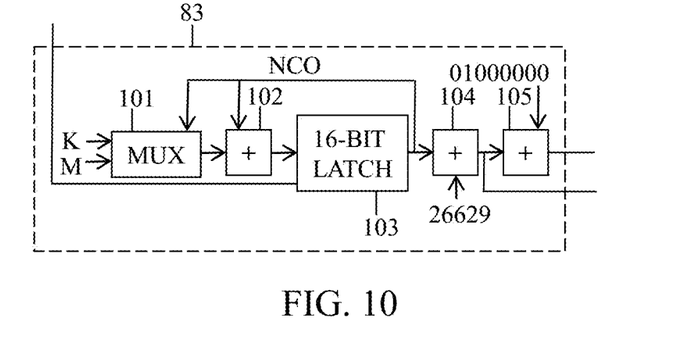
FIG. 10 is a schematic block diagram of a second embodiment of the NCO of FIG. 8.

FIG. 10 is a block diagram of a second embodiment of the NCO 83 of FIG. 8 that allows for overflows and phase correction.

In FIG. 10, a multiplexer 101 receives a first variable K and a second variable M. The output frequency of the NCO 83 is equal to $K \times Fs/(2^N-M+K)$, where K=2046, Fs=48fx=49.107 MHz, and N is the length of the NCO 83 output (e.g., 16 bits). For an exact frequency, K=2046 and $2^N$-M+K=16369, where N=16, M=51213.

The output of the multiplexer 101 is connected to a first adder 102. The output of the first adder 102 is connected to a 16-bit latch 103. The 16-bit latch 103 also receives an 8fx clock signal. The 16-bit output bus of the 16-bit latch 103 is connected to the first adder 102. The $16^{th}$ bit (i.e., d15) of the 16-bit output bus of the 16-bit latch 103 is connected to the select input of the multiplexer 101 for selecting M when d15=1 and selecting K when dl 5=0.

The 16-bit output bus of the 16-bit latch 103 is also connected to a second adder 104. The second adder 104 also receives a constant 26629. The 6-bit output bus of the second adder 104 is the output of the NCO 83 that is connected to the LUT in the Galileo 2fx function block 55 of FIG. 8 that outputs a cos signal and is connected to a third adder 105.

The third adder 105 of FIG. 10 receives bits "01000000," which allow for overflow and phase correction. The 6-bit output bus of the third adder 105 is the output of the NCO 83 that is connected to the LUT in the Galileo 2fx function block 55 of FIG. 8 that outputs a sin signal.

Figure 11A:
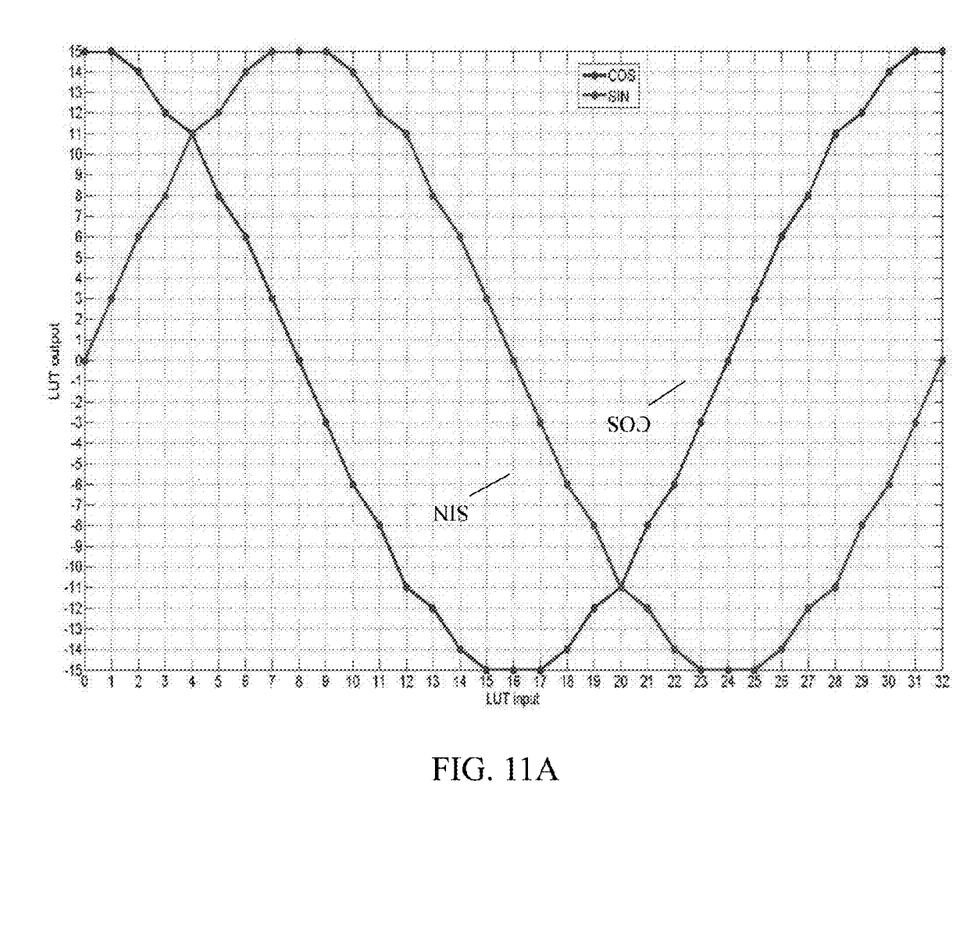
FIG. 11A is a graph of an implementation of a sine LUT and a cosine LUT in accordance with an embodiment of the present invention.
Figure 11B:
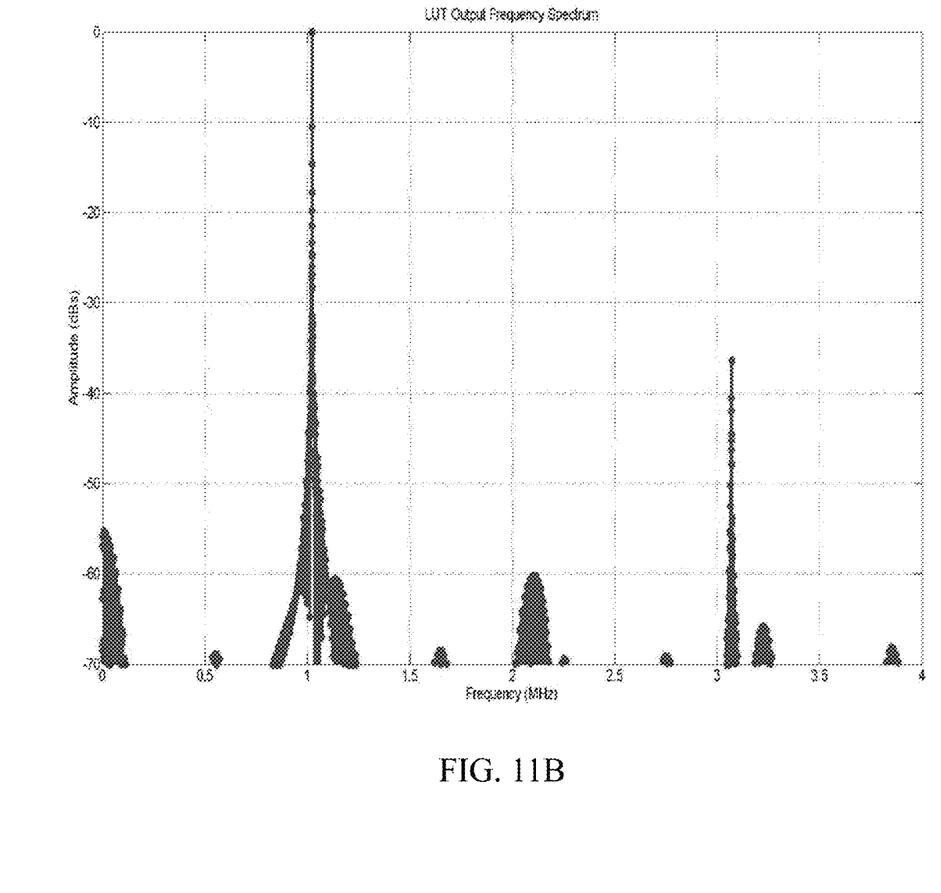
FIG. 11B is a graph of the frequency spectrum of the LUTs of FIG. 11A.

FIG. 11A are the graphs of sin and cos LUT signals generated by the NCO 83 of FIG. 8. FIG. 11B is a graph of the frequency spectrum of the LUT signals of FIG. 11A.

Figure 12A:
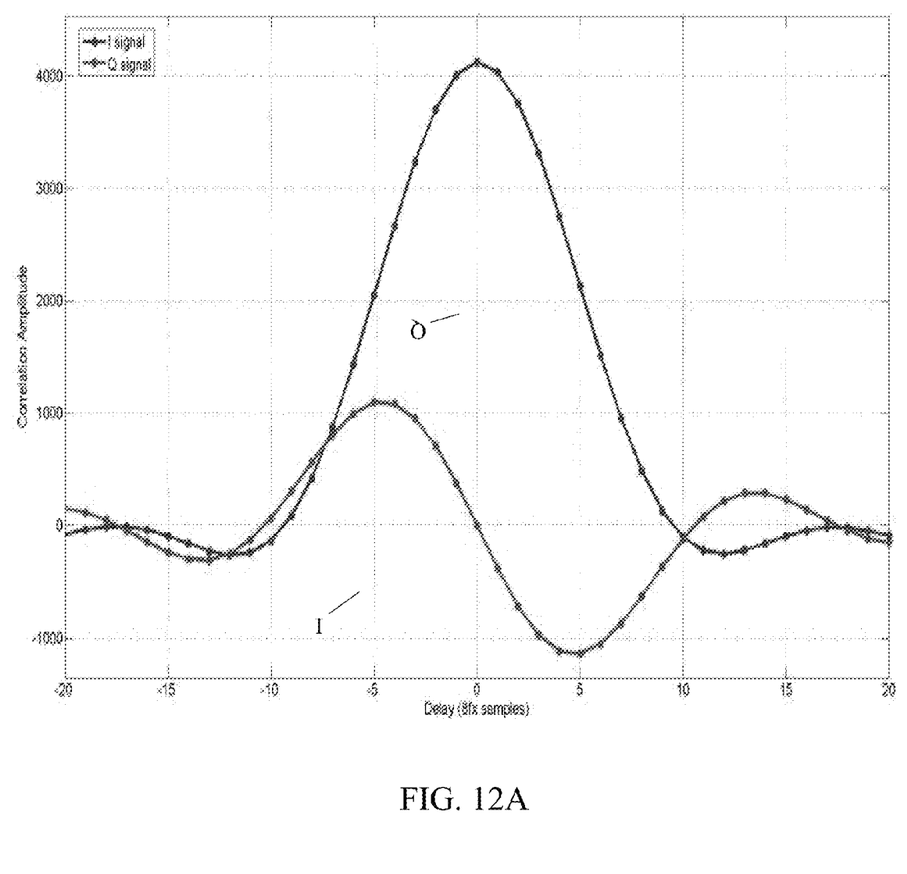
FIG. 12A is a graph of the result of the Galileo 2fx function block of FIG. 5 processing a lower sidelobe of a Galileo BOC(1,1) satellite signal without applying phase correction to the signal.

FIG. 12A is a graph of the result of the Galileo 2fx function block of FIG. 5 processing a lower sidelobe of a Galileo BOC(1,1) satellite signal where phase correction is not applied to the signal.

Figure 12B:
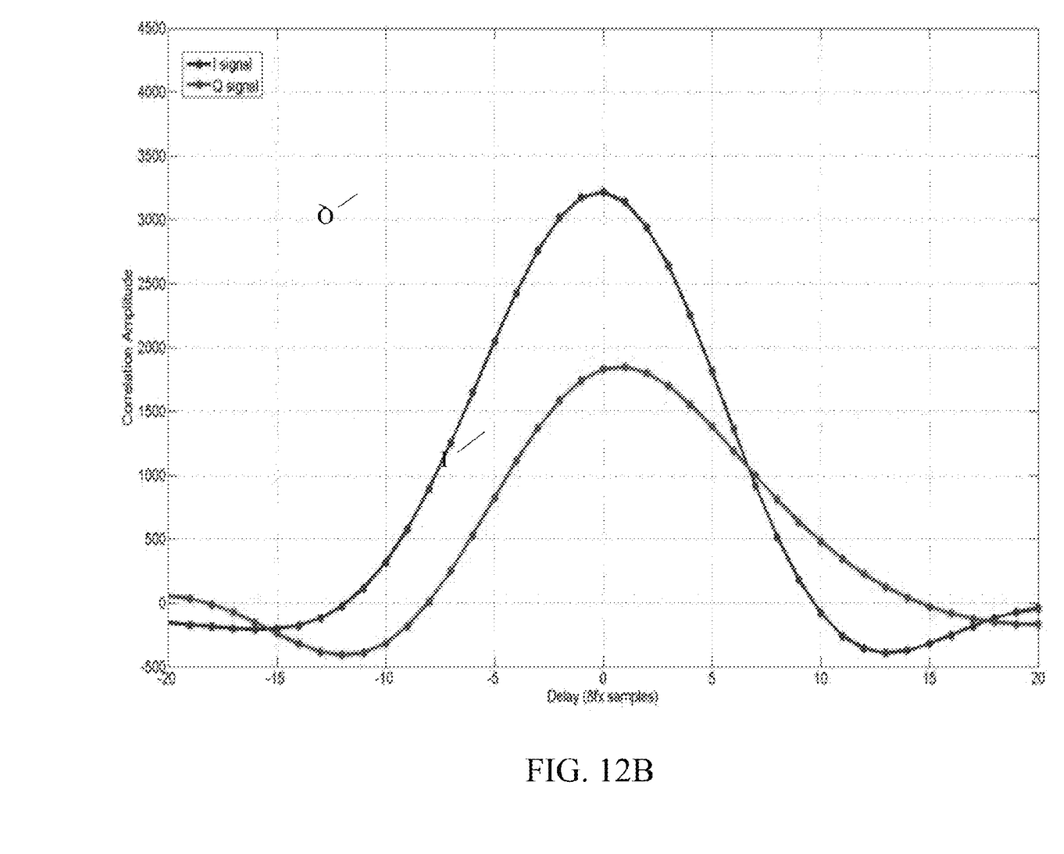
FIG. 12B is a graph of the result of the Galileo 2fx function block of FIG. 5 processing an upper sidelobe of a Galileo BOC(1,1) satellite signal before phase correction is applied to the signal.

FIG. 12B is an illustration of the result of the Galileo 2fx function block of FIG. 5 processing an upper sidelobe of a Galileo BOC(1,1) satellite signal before phase correction is applied to the signal. Phase correction will later be applied to the signal.

Figure 13:
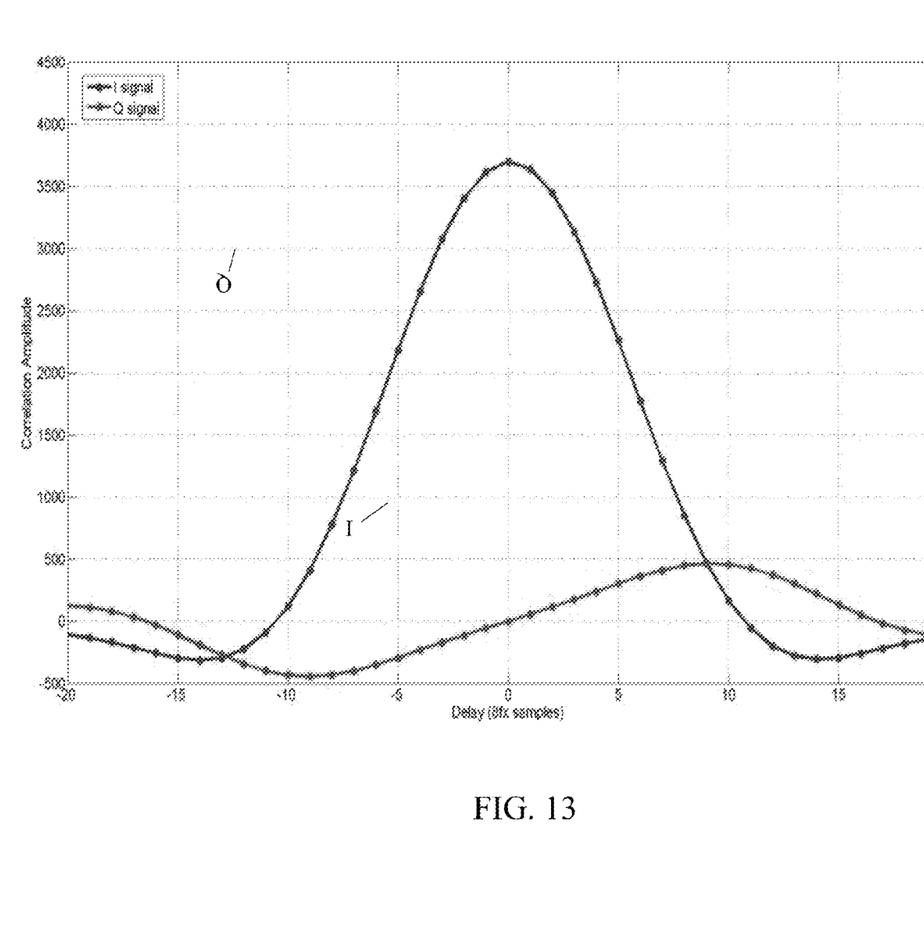
FIG. 13 is an illustration of the result of the Galileo 2fx function block of FIG. 5 processing an upper sidelobe of a Galileo BOC(1,1) satellite signal after 30 degrees of phase correction is applied to the signal.

FIG. 13 is a graph of the result of the Galileo 2fx function block of FIG. 5 processing an upper sidelobe of a Galileo BOC(1,1) satellite signal after 30 degrees of phase correction is applied. Phase correction allows the upper sidelobe to be rotated in phase with respect to the lower sidelobe. This capability is used to correct for carrier phase mismatch between the two sidelobes caused by different phase rotations each sees as the signal proceeds through the receiver. This helps match the lower and upper sidelobes in phase before they are added together. FIG. 13 illustrates the matched phase of the upper sidelobe after the phase correction has been applied.

While the present invention has been particularly shown and described with reference to certain embodiments thereof, it will be understood by those of ordinary skill in the art that various changes in form and details may be made therein without departing from the spirit and scope of the present invention.

What is claimed is:

1. A method of processing navigational signals with reduced bandwidth, comprising:
   receiving a combination of two navigational signals, where at least one of the navigational signals includes an upper sidelobe and a lower sidelobe;
   reducing the frequency of the combined two navigational signals to an intermediate frequency (IF);
   converting the IF signal to digital signals that can represent a complex signal;
   translating the frequency of the IF signal to near baseband;
   filtering the near baseband signal;
   reducing the sampling rate of the filtered near-baseband signal by a user-definable factor; and
   translating a user-definable selection of the reduced, filtered, near-baseband signal to a single sidelobe.

2. The method of claim 1, further comprising:
   storing the single sidelobe in memory; and
   processing the single sidelobe for navigational purposes.

3. The method of claim 1, wherein receiving the combination of two navigational signals comprises receiving a combination of a Global Positioning System (GPS) signal and a Galileo Global Navigation Satellite System (GNSS) Binary Offset Carrier (1,1) (BOC(1,1)) signal, where the Galileo GNSS BOC(1,1) signal includes the upper sidelobe and the lower sidelobe.

4. The method of claim 1, wherein reducing the frequency of the combined two navigational signals to an intermediate frequency (IF) comprises reducing the combined signal to a signal Fs=48fx, where fx=1.0230625 MHz.

5. The method of claim 1, wherein translating the frequency of the IF signal to near baseband comprises carrier mixing with a look-up-table (LUT) that includes a sin signal and a cos signal.

6. The method of claim 1, wherein filtering the near baseband signal comprises low-pass filtering the near baseband signal at 3 MHz.

7. The method of claim 1, wherein reducing the sampling rate of the filtered near-baseband signal by a user-definable factor comprises reducing the sampling rate of the filtered near baseband signal by a factor of 6.

8. The method of claim 1, wherein translating the user-definable selection of the reduced, filtered, near-baseband signal to a single sidelobe comprises selecting a sidelobe configuration of the reduced, filtered, near baseband signal from at least one of the upper sidelobe or the lower sidelobe.

9. The method of claim 8, wherein translating the user-definable selection of the reduced, filtered, near-baseband signal to a single sidelobe comprises:
mixing the digital signals with sin and cos signals from a look-up-table (LUT), where the LUT is generated using a numerically controlled oscillator (NCO) driven by an 8fx clock signal;
filtering the mixed digital signals;
reducing the sampling rate of the filtered and mixed digital signals;
multiplying each selected sidelobes by the LUT;
adding the results of the multiplications;
filtering the result of the addition; and
re-quantizing the result of the filtering to 2fx, 2-bit, Galileo complex samples.

10. The method of claim 9, further comprising:
filtering further the reduced, filtered, and mixed digital signals;
reducing further the further filtered signal;
re-quantizing the result of the further reduced signal to 2fx, 2-bit, GPS complex samples; and
multiplexing the 2fx re-quantized samples.

11. The method of claim 9, wherein the NCO comprises:
a multiplexer for multiplexing variables K and M, under control of a most significant bit of a 16-bit latch driven by the 8fx clock signal, where M is selected when the 16-bit latch outputs a 1, where K is selected when the 16-bit latch outputs a 0, and where K=2046, N=16, and $2^N-M+K=16369$;
a first adder for adding the result of multiplexing with outputs of the 16-bit latch;
the 16-bit latch for latching into the 16-bit latch the output of the sum of adding the result of multiplexing with outputs of the 16-bit latch under control of the 8fx clock signal;
a second adder for adding the output of the 16-bit latch to 26629, wherein the sum involving 26629 is output as the cos signal; and
a third adder for adding the output of adding the output of the 16-bit latch to 26629 to "010000," wherein the sum involving "010000" is output as the sin signal.

12. The method of claim 9, wherein the NCO comprises:
a multiplexer for multiplexing variables K and M, under control of a most significant bit of a 16-bit latch driven by the 8fx clock signal, where M is selected when the 16-bit latch outputs a 1, K is selected when the 16-bit latch outputs a 0, and where K=2046, N=16, and $2^N-M+K=16369$;
a first adder for adding the result of multiplexing with outputs of the 16-bit latch;
the 16-bit latch for latching into the 16-bit latch the output of the sum of adding the result of multiplexing with outputs of the 16-bit latch under control of the 8fx clock signal;
a second adder for adding the output of the 16-bit latch to 26629, wherein the sum involving 26629 is output as the cos signal; and
a third adder for adding the output of the 16-bit latch to 26629 to "01000000," wherein the sum involving "010000" is output as the sin signal.

13. An apparatus for processing navigational signals with reduced bandwidth, comprising:
a receiver configured to receive a combination of two navigational signals, where at least one of the navigational signals includes an upper sidelobe and a lower sidelobe;
a frequency reduction block connected to the receiver configured to reduce the frequency of the combined two navigational signals to an intermediate frequency (IF);
an array of analog-to-digital converters (ADCs) connected to the frequency reduction block configured to convert the IF signal to digital signals that can represent a complex signal;
a frequency translator connected to the array of ADCs configured to translate the frequency of the IF signal to near baseband;
a filter connected to the frequency translator configured to filter the near baseband signal;
a sample-rate reducer connected to the filter configured to reduce a sampling rate of the filtered near-baseband signal by a user-definable factor; and
a signal translator connected to the sample-rate reducer configured to translate a user-definable selection of the reduced, filtered, near-baseband signal to a single sidelobe.

14. The apparatus of claim 13, further comprising:
a memory connected to the signal translator configured to store the single sidelobe; and
a processor configured to process the single sidelobe for navigational purposes.

15. The apparatus of claim 13, wherein the receiver is configured to receive a combination of a Global Positioning System (GPS) signal and a Galileo Global Navigation Satellite System (GNSS) Binary Offset Carrier(1,1) (BOC (1,1)) signal, where the Galileo GNSS BOC(1,1) signal includes the upper sidelobe and the lower sidelobe.

16. The apparatus of claim 13, wherein the frequency reduction block is configured to reduce the combined signal to a signal Fs=48fx, where fx=1.0230625 MHz.

17. The apparatus of claim 13, wherein the frequency translator comprises a carrier mixer and a look-up-table (LUT) that includes a sin signal and a cos signal.

18. The apparatus of claim 13, wherein the filter comprises a 3 MHz low-pass filter.

19. The apparatus of claim 13, wherein the sample-rate reducer is configured to reduce the sampling rate by a factor of 6.

20. The apparatus of claim 13, wherein the signal translator is configured to select a sidelobe configuration of the reduced, filtered, near baseband signal from at least one of the upper sidelobe the lower sidelobe.

21. The apparatus of claim 20, wherein the signal translator further comprises:

a carrier mixer configured to mix the digital signals with sin and cos signals from a look-up-table (LUT), where the LUT is generated using a numerically controlled oscillator (NCO) driven by an 8fx clock signal;

a second filter connected to the carrier mixer configured to filter the mixed digital signals;

a second sample-rate reducer connected to the filter configured to reduce the sampling rate of the filtered and mixed digital signals;

a multiplier connected to the sample-rate reducer configured to multiply each selected sidelobes by the LUT;

an adder connected to the multiplier configured to add the results of the multiplications;

a third filter connected to the adder configured to filter the result of the addition; and a re-quantizer connected to the second filter configured to re-quantize the result of the filtering to 2fx, 2-bit, Galileo complex samples.

22. The apparatus of claim 21, further comprising:

a fourth filter connected to the sample-rate reducer configured to filter further the reduced, filtered, and mixed digital signals;

a third sample-rate reducer connected to the fourth filter configured to reduce further the further filtered signal;

a second re-quantizer connected to the third sample-rate reducer configured to re-quantize the further reduced signal to 2fx, 2-bit, GPS complex samples; and a multiplexer connected to the re-quantizer and second re-quantizer configured to multiplex the 2fx re-quantized samples.

23. The apparatus of claim 21, wherein the NCO comprises:

a multiplexer configured to multiplex variables K and M, under control of a most significant bit of a 16-bit latch driven by the 8fx clock signal, where M is selected when the 16-bit latch outputs a 1, where K is selected when the 16-bit latch outputs a 0, and where K=2046, N=16, and $2^N-M+K=16369$;

a second adder connected to the multiplexer configured to add the result of multiplexing with outputs of the 16-bit latch;

the 16-bit latch connected to the second adder configured to latch the output of the second adder under control of the 8fx clock signal;

a third adder connected to the 16-bit latch configured to add the output of the 16-bit latch to 26629, where the result is the cos signal; and a fourth adder configured to add the output of adding the output of the 16-bit latch to 26629 to "010000," where the result is the sin signal.

24. The apparatus of claim 21, wherein the NCO comprises:

a multiplexer configured to multiplex variables K and M, under control of a most significant bit of a 16-bit latch driven by the 8fx clock signal, where M is selected when the 16-bit latch outputs a 1, where K is selected when the 16-bit latch outputs a 0, and where K=2046, N=16, and $2^N-M+K=16369$;

a second adder connected to the multiplexer configured to add the result of multiplexing with outputs of the 16-bit latch;

the 16-bit latch connected to the second adder configured to latch the output of the second adder under control of the 8fx clock signal;

a third adder connected to the 16-bit latch configured to add the output of the 16-bit latch to 26629, where the result is the cos signal; and a fourth adder configured to add the output of adding the output of the 16-bit latch to 26629 to "01000000," where the result is the sin signal.

* * * * *